United States Patent [19]
Backe et al.

[11] Patent Number: 4,789,001
[45] Date of Patent: Dec. 6, 1988

[54] OPERATING SYSTEM FOR A VALVE

[75] Inventors: Bengt S. Backe, Dundee; Lamoyne W. Durham, Bartlet, both of Ill.

[73] Assignee: South Bend Lathe, Inc., South Bend, Ind.

[21] Appl. No.: 916,230

[22] Filed: Oct. 7, 1986

Related U.S. Application Data

[63] Continuation-in-part of Ser. No. 647,158, Sep. 4, 1984, Pat. No. 4,706,456.

[51] Int. Cl.$^4$ .............................................. F16K 37/00
[52] U.S. Cl. .............................. 137/554; 137/624.13; 251/129.11; 251/263; 74/49; 74/804
[58] Field of Search ...................... 74/49, 55, 567, 804, 74/805; 137/554, 624.11, 624.13; 251/229, 263, 129.11

[56] References Cited

U.S. PATENT DOCUMENTS

| | | | |
|---|---|---|---|
| 1,959,811 | 5/1934 | Brady et al. | 251/263 |
| 3,015,963 | 1/1962 | Terry | 251/263 |
| 3,184,124 | 5/1965 | Beck | 74/804 |
| 3,279,391 | 10/1966 | Masciopinto | 74/49 |
| 4,156,437 | 5/1979 | Chivens et al. | 137/554 |
| 4,526,342 | 7/1985 | Wakefield | 251/129.11 |

Primary Examiner—A. Michael Chambers
Attorney, Agent, or Firm—Thomas J. Dodd

[57] ABSTRACT

A control system is provided for a hydraulic actuating system having a multi-phase stepping motor with a driver therefor which supplies and controls DC current through each of the motor windings such that no current is induced into the control winding from adjacent windings. The stepping motor precisely controls the rotation of an eccentric cam engaging an actuating plunger which actuates a control valve of the hydraulic actuating system. The driver receives control signals from a computer programmed to calculate, from user input command signals indicative of the desired system condition, and generate those control signals which most quickly achieve a rough approximation of the desired system condition. After this rough approximation is attained, the computer generates new control signals for the driver as a function of feedback signals and/or system component characteristics so as to precisely achieve the desired system condition. The operating system for the valve includes a bearing arrangement rotatably connected about the eccentric cam. This cam engages the actuating plunger through a connection linkage which includes the bearing arrangement and a linkage for maintaining contact between the plunger and an outer race of the bearing arrangement. Different embodiments of this operating system are disclosed showing means of applying different loading torques and valve response times.

30 Claims, 5 Drawing Sheets

OPERATING SYSTEM FOR A VALVE

BACKGROUND AND SUMMARY OF THE INVENTION

The present application is a continuation-in-part of U.S. patent application Ser. No. 647,158, filed on Sept. 4, 1984, now U.S. Pat. No. 4,706,456 issued 11/17/87 entitled "Method and Apparatus for Controlling Hydraulic Systems".

The present invention relates generally to control systems for hydraulic devices and, more particularly, to such control systems for use in machine tools. This continuation in part application is specifically directed to devices for precisely positioning spool valves.

Machine tools typically require a workpiece or tool element to be positionable or movable linearly and/or rotatably during the course of machining. This positioning or movement is often controlled hydraulically. For example, hydraulically actuated pistons may be employed adjacent the sides of the main slides of lathes to provide linear motion between the head and tail ends of the bed. Four-way valves typically control the flow of hydraulic fluid to and from these pistons. Previously, electrohydraulic servo valves have been used to actuate the four-way valves.

Unfortunately, electrohydraulic servo valves are comparatively expensive and do not provide sufficiently reliable and accurate control over the valve position. Such control is desirable to achieve greater machining precision. It has often been very difficult to accurately control the null position of the four-way valve such that no fluid flow is permitted to or from hydraulic control lines, especially under changing working conditions such as increasing temperature. It has also been difficult to precisely determine the rate of fluid flow in the hydraulic control lines for a given four-way valve setting with such servo valves. At least in part, this is due to component hystereses. Sources of these hystereses include friction and inertia between moving parts. For example, friction and inertia not only retard movement of the four-way valve spool within the valve housing, but also prevent it entirely below a given level of applied motive force. Also, overlap of the outer surface of the four-way valve spool over flow ports results in a wide null region or deadband wherein the application of motive force sufficient to cause the valve to move still does not result in fluid flow-through the valve. Another disadvantage of these servo valves is it has often been necessary to provide separate control systems for linear and rotary motive systems, thus increasing machine costs and efficiency losses even more.

Stepping motors have been previously employed to control movement and positioning generally. A conventional way to drive stepping motors is by using resistors to limit the current going to the different motor windings. However, this driver method produces operating inefficiencies from the wasted power and heat build-up in the resistors used to limit stepping motor winding currents. Also, such drivers provide only full or half step resolution on particular stepping motors.

Another prior method of driving stepping motors employs a "chopper" driver which detects the current level going through the winding and limits it by shutting off the current completely when a predetermined upper limit is attained. When the current level then decays to a predetermined lower limit, the chopper driver turns the current flow on again. Thus, the current for each winding of a stepping motor is continuously turned off and on again to produce an average current over time which is within the ratings of the stepping motor. The chopper driver permits modulation or control of the amount of current going through each winding by adjustment of the levels at which the current is turned off and on. Chopper drivers are typically used in microstepping operating systems wherein the position of the stepping motor is controlled between its natural or inherent poles. However, chopper driver systems have been found to be impractical where extremely fine resolution is required. This results since, when the current requirement approaches zero in a particular control winding, significant induced currents arise in that winding from adjacent windings having a high current running therethrough. Thus, within practical limits, it is thus nearly impossible to achieve zero current in a particular control winding. This means that the angularity of the stepping motor cannot be precisely established and, if the stepping motor was used to actuate a valve, precise control of the valve openings and the flow rate therethrough cannot be attained. Where chopper driven stepping motors are employed with machine tools specifically, further impression may result because the continuous turning on and off of the current produces a continuously variable torque.

Even where a stepping motor is capable of precisely positioning the valve, it is desirable to provide an efficient and reliable connection means between the valve and the stepping motor such that this precision is not lost. This connection should involve a minimum of intercomponent friction and a minimum of stress on the stepping motor such that valve response time is not degraded. Further, the connection should include a failsafe device to prevent the valve from being displaced to a system failure position. With a spool valve this may, for example, arise where the valve member is overextended and hydraulic fluid is lost from the system.

Various modern hydrostatic transmission systems also require increasingly greater precision in their control systems. For example, a variable displacement pump (VDP) may be employed to drive a fluid motor providing spindle rotation. Control for the VDP has been provided by a closed-loop analogue system where analogue command signals are input to a controller which displaces a hydraulic actuator that acts through a valve system to displace the VDP swash plate. Analogue feedback signals are provided off the fluid motor and are input to the controller. The controller makes a comparison between the command signals and the feedback signals to generate error signals to alter the swash plate displacement. These error signals gradually decrease along a continuous curve as the actual swash plate position approaches the desired position. Several problems, largely a result of VDP and fluid motor idiosyncrasies, have been found where extremely precise control of these transmission systems is desired.

There are several characteristics of individual VDPs that make control with simple closed-loop analogue systems very difficult. For example, there is often a considerable amount of deadband and hystereses in the swash plate operation itself. In other words, an increase of the command signal does not cause immediate swash plate displacement. Also, the command signal must exceed a given level before any swash plate movement results. With analogue systems, this can easily result in imprecisions and instabilities. At some point, the error signal will not be sufficient to cause swash plate displacement. Thus, optimum VDP output wil never be obtained. Further, the lag time in swash plate response to command signals typically results in excessive overshooting and undershooting. This unresponsiveness and control inaccuracy is exacerbated when the transmission system must be operated at a fixed speed under varying load conditions. Increasing the gain of the near zero error signal to compensate for the hystereses often does not achieve greater accuracy. Instead, because of the swash plate response lag time, the swash plate displacement oscillates about the desired position for an extended period of time.

Another problem encountered in prior hydrostatic transmission systems is when abrupt and large speed changes are necessary. It is often desirable to go from a low speed to a high speed or from one direction to another instantaneously or at least to accelerate in the shortest possible time. Where analogue loop command systems have been employed, the initial swash plate displacement is relatively fast because the error between the command and feedback signal is quite large. However, as the optimum level is approached along a continuous error signal curve, the error becomes less and less and will eventually cease to be sufficient to drive the swash plate such that the optimum is not attained. Inputting a larger command signal may cause the optimum swash plate displacement to be exceeded, but then the same hystereses problem results when the swash plate position is backed down to the optimum level.

It is therefore an object of the present invention to provide an improved motive control system having increased precision and responsiveness.

Another object is the provision of an improved control system for actuating valve elements and control flow therethrough.

Still another object is to provide an improved device for precisely positioning a valve to control hydraulic fluid flow.

Yet still another object is the provision of a valve operating system having shortened valve response time.

A further object is to provide a control connection for a valve operating system having reduced loading torque.

A still further object is the provision of a valve operating system having reduced wear characteristics between its component devices and improved efficiency in translating rotational accuracy motion into longitudinal resultant motion.

A yet still further object is to provide a control system for hydraulic actuating systems which compensates for various system component characteristics as well as operating conditions.

Yet another object is the provision of a control system for machine tools having increased response speed toward achieving desired changes in movable element orientation.

These and other objects of the present invention are provided in a control system for a hydraulic actuating system having a multi-phase stepping motor with a driver therefor which supplies and controls DC current through each of the motor windings such that no current is induced into the control winding from adjacent windings. The stepping motor precisely controls the rotation of an eccentric cam engaging an actuating plunger which actuates a control valve of the hydraulic actuating system. The driver receives control signals from a computer programmed to calculate, from user input command signals indicative of the desired system condition, and generate those control signals which most quickly achieve a rough approximation of the desired system condition. After this rough approximation is attained, the computer generates new control signals for the driver as a function of feedback signals and/or system component characteristics so as to precisely achieve the desired system condition.

The operating system for the valve includes a bearing arrangement rotatably connected about the eccentric cam. This cam engages the actuating plunger through a connection linkage which includes the bearing arrangement and a linkage for maintaining contact between the plunger and an outer race of the bearing arrangement. Different embodiments of this operating system are disclosed showing means of applying different loading torques and valve response times.

The control system of the present invention has been found to be particularly suitable for use in numeric control of machine tools, such as lathes, either for controlling a workpiece or controlling cutting tool motion. Control programming of the computer permits extensive customization without loss of precision.

Further objects, features, and advantages of the present invention will become more apparent from the following description when taken with the accompanying drawings which show, for purposes of illustration only, several embodiments in accordance with the present invention.

DETAILED DESCRIPTION OF THE DRAWINGS

Figure 1:
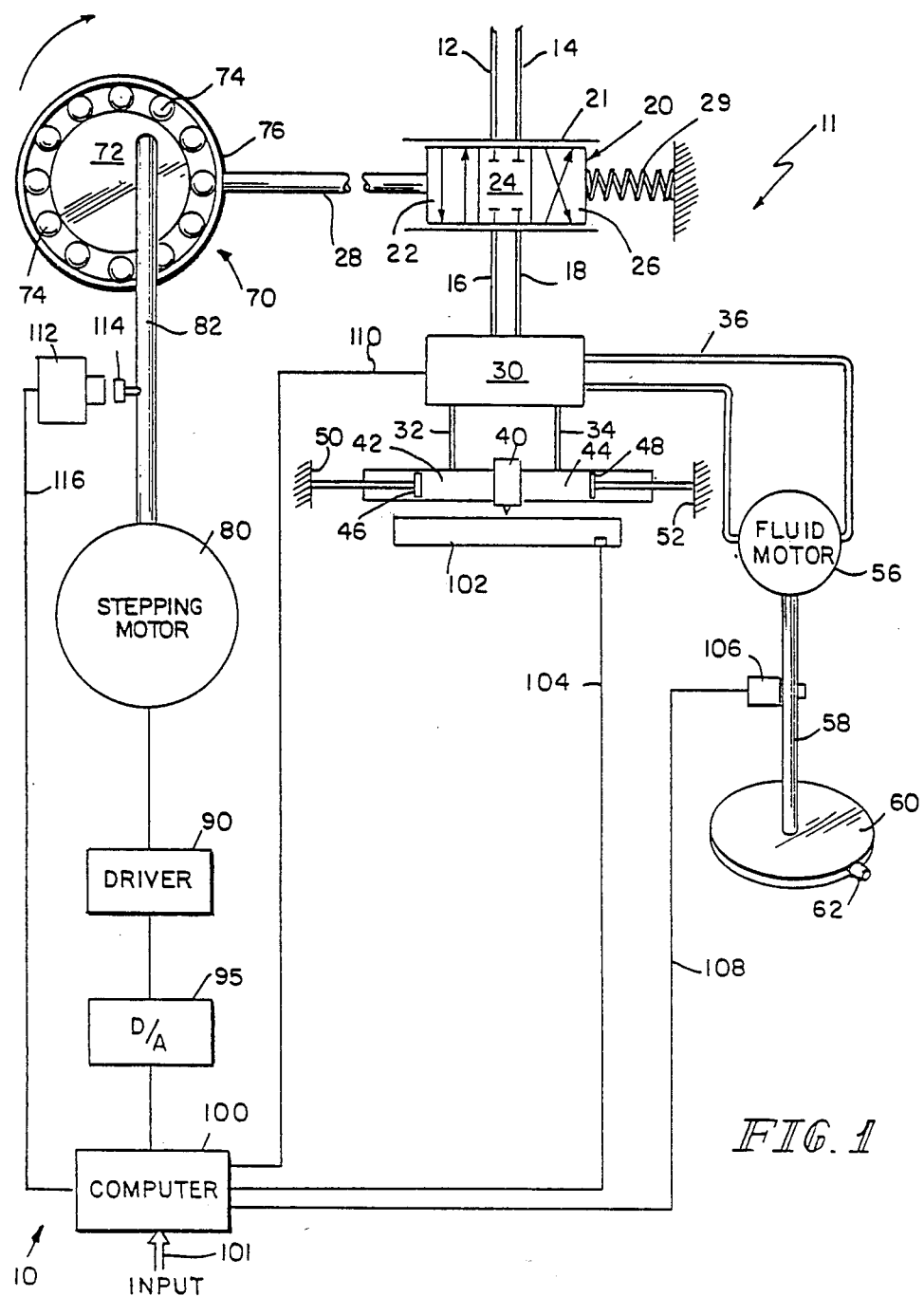
FIG. 1 shows, in block diagram and schematic form, a control system and hydraulic actuating system embodying the principles of the present invention.

FIG. 1, which illustrates a preferred embodiment of the present invention, shows a control system 10 for a hydraulic actuating system 11 suitable for supplying motive force to movable elements of, for example, a machine tool. In particular, control system 10 provides precise control of the position and/or velocity of linearly slidable or rotatable machine elements, such as work supports or cutting tools.

In the portion of hydraulic actuating system 11 shown in FIG. 1, hydraulic fluid and pressure is provided along supply line 12 to four-way spool valve 20, slideable within bore 21 of the valve housing (not shown). Hydraulic pressure and fluid drain is in communication with four-way valve 20 along return line 14. Hydraulic control lines 16 and 18 are also in communication with four-way valve 20 so as to receive hydraulic fluid from and supply such fluid to supply line 12 and return line 14, respectively.

Four-way valve 20 controls the amount and direction of the flow of hydraulic fluid between lines 12, 14, 16 and 18. Valve 20 includes three distinct actuating positions, 22, 24, and 26. In position 22, supply line 12 is in communication with control line 16 and control line 18 is in communication with return line 14. Position 24 is the null or shut-off position where neither supply line 12 or return line 14 is in communication with either control line 16 or control line 18. In position 26, supply line 12 is in communication with control line 18 and control line 16 is in communication with return line 14. When valve 20 is between these positions the amount of hydraulic flow is generally proportional to the extent of its displacement toward a particular position.

Control lines 16 and 18 are connected to flow splitting valve 30 which alternatively applies the hydraulic fluid from control lines 16 and 18 to control lines 32 and 34 or 36 and 38, respectively. Valve 30 may, for example, be actuated by electrical switching solenoids. This arrangement has been found to be especially desirable where the hydraulic actuating system controls a plurality of movable elements which are not actuated simultaneously.

Control lines 32 and 34 supply hydraulic pressure to actuating piston cylinders 42 and 44, respectively, secured on opposite sides of, for example, machine tool workpiece slide 40. The hydraulic pressure differential between fluid in cylinder 42 and 44 against pistons 46 and 48, respectively, causes slide 40 to move linearly between end walls 50 and 52 bracing pistons 46 and 48, respectively. For example, when valve 20 is in position 22, and valve 30 is switching fluid to control lines 32 and 34, supply line 12 provides hydraulic pressure through control line 16 and 32 to cylinder 42 while return line 14 provides hydraulic pressure relief from cylinder 44 through control lines 34 and 18. As a result, the hydraulic pressure in cylinder 42 exceeds that in cylinder 44, and slide 40 moves to the right toward end wall 52. When valve 20 is in null position 24, flow of hydraulic fluid from supply line 12 and to return line 14 is shut off. Thus, the hydraulic pressure in cylinders 42 and 44 will be equalized, and slide 40 will remain stationary. When valve 20 is in position 26, supply line 12 provides hydraulic pressure through control lines 18 and 34 to cylinder 44 while return line 14 provides hydraulic pressure relief from cylinder 42 through control lines 32 and 16. As a result, the hydraulic pressure in cylinder 44 exceeds that in cylinder 42, and slide 40 moves to the left toward end wall 50.

A particular advantage of this piston/cylinder arrangement for actuating slide 40 is in that it enables the actuating force in cylinders 42 and 44 to be balanced more readily than in prior hydraulic slide actuators. This results, at least in part, because the surface area of pistons 46 and 48 exposed to hydraulic pressure may be made equal and because the flow of hydraulic pressure exerting the slide actuating force is always away from slide 40. Although only one piston/cylinder arrangement is illustrated on either side of slide 40, the present invention specifically contemplates the use of a plurality of such piston/cylinder arrangements on either side of slide 40.

When valve 30 is switching fluid to control lines 36 and 38, typically, no hydraulic fluid flows through control lines 32 and 34 to or from control lines 16 and 18, respectively. Control lines 36 and 38 are connected to fluid motor 56 having rotatably output shaft 58. This shaft is, for example, connected to machine tool turret 60 having tool 62 secured thereto. Differential hydraulic pressure between control lines 36 and 38 results in rotation of shaft 58 and, thus tool 62 of turret 60.

Valve 20 is actuated between positions 22, 24, and 26 by plunger 28 and is biased against plunger 28 by spring 29. Eccentric cam 70 includes inner eccentric disk 72 supported by ball bearings 74 mounted within ball bearing race 76. Plunger 28 abuts the outer surface of ball bearing race 76 of eccentric cam 70 and is pushed against valve 20 as cam 70 rotates. The amount of hydraulic flow through valve 20 is, thus, generally proportional to the displacement of plunger 28.

The functional orientation of cam 70 with respect to valve 20 is such that as cam 70 rotates to move the outer surface of ball bearing race 76 away from plunger 28 (clockwise in FIG. 1), valve 20 moves to the left toward position 26. Likewise, as cam 70 rotates to move the outer surface of race 76 toward plunger 28 (counterclockwise in FIG. 1), valve 20 moves against the bias of spring 29 to the right toward position 22. In this way, cam 70 controls the amount, speed, and direction of the displacement of plunger 28.

Cam 70 is connected to output shaft 82 of multi-phase electric stepping motor 80 along, for example, the rotational axis of cam 70. A suitable commercially available stepping motor is, for example, made by Berger-Lahr as part number RDM 566/50 S.S. 075A. Rotation of shaft 82 and resolution of stepping motor 80 is precisely controlled by driver 90 (described in detail below with regard to FIG. 2). Driver 90 receives control signals through digital-to-analogue converter D/A 95 of micro computer of microprocessor unit 100. This computer receives command signals from the user along input 101 indicative of the desired position and/or velocity of slide 40 and/or tool 62. Computer 100 generates digital control signals which are converted into analogue form by D/A 95 and into appropriate current input into appropriate windings of stepping motor 80.

Figure 5:
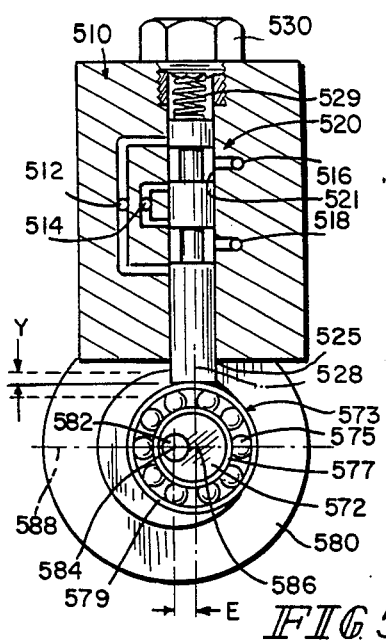
FIG. 5 shows a front elevational view of one embodiment of the eccentric cam valve operating system of the present invention with portions of the valve housing broken away.
Figure 6:
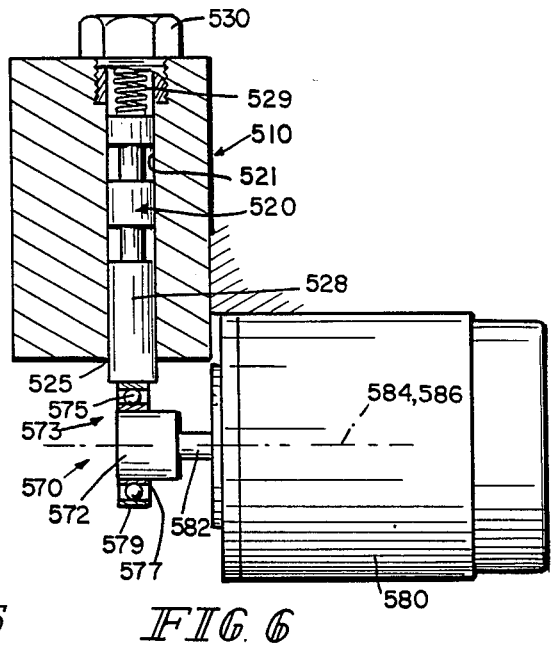
FIG. 6 shows a side elevational view of the embodiment of FIG. 5 with different portions of the valve housing and portions of bearing arrangement broken away.

FIGS. 5 and 6 illustrate one embodiment of this valve operating system in greater detail. Four-way spool valve 520 is slideably mounted within bore 521 of valve housing 510. Hydraulic fluid and pressure is provided via supply line 512 to valve 520. The hydraulic pressure and fluid drain is in communication with valve 520 via return line 514. Hydraulic control lines 516 and 518 are also in communication with valve 520 so as to receive fluid from and supply fluid to lines 512 and 514, respectively, when valve 520 is actuated. As shown in FIG. 5, valve 520 is in the null or shut-off position.

Plunger 528 is, for example, integrally formed as a portion of valve 520 and extends along bore 521 to exit and protrude beyond housing 510 at port 525. Biasing spring 529 is provided at a portion of valve 520 opposing plunger 528 to urge plunger 528 out of housing 510 through port 525. Spring 529 is secured against valve 520 by cap 530. That cap is, for example, threadably secured to housing 510.

As biased by spring 529, plunger 528 engages an eccentric cam-bearing arrangement 570 driven by multi-phase electric stepping motor 580. Valve housing 510 and stepping motor 580 are preferably fixed relative to such other. Stepping motor 580 includes a rotational output shaft 582 having longitudinal axis 584. Inner cylinder 572 is mounted on shaft 582 off center from longitudinal axis 584 such that circular rotation of shaft 582 causes eccentric rotation of cylinder 572. Bearing member 573 is mounted about the circumference of eccentric cylinder 572. Bearing member 573 includes, for example, a plurality of ball elements 575 supported between an inner bearing race 577 and an outer bearing race 579. Inner race 577 is thus movable with respect to outer race 579 by the rolling action of ball elements 575. Plunger 528 abuts the circumferential surface of outer race 579 and is maintained in that relation as the eccentric cam rotates by the biasing of spring 529.

Shaft 582 and, thus, cylinder 572 rotate about axis 584. The longitudinal axis of cylinder 572 is axis 586. This axis is parallel to axis 584 and spaced apart therefrom by a distance "E". This distance "E" defines the eccentricity of rotation of cylinder 572.

Figure 11:
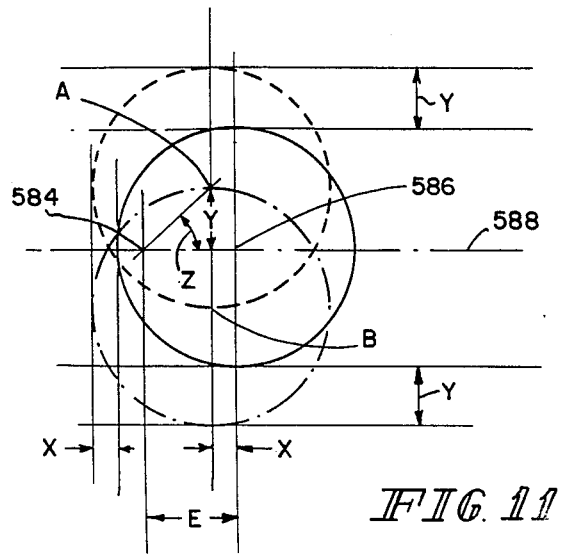
FIG. 11 shows diagramatically the relative eccentric cam operating positions.

As cylinder 572 rotates, axis 586 is displaced vertically and horizontally with respect to the view of FIG. 5. The vertical component of this displacement provides the movement of valve 520. As shown in FIG. 5, axis 586 is aligned along the same horizontal axis 58 as longitudinal axis 584. When cylinder 572 rotates counterclockwise axis 586 is displaced upwardly and leftwardly to point A, as shown in FIG. 11. When cylinder 572 rotates clockwise axis 586 is displaced downwardly and leftwardly to point B. For example, when cylinder 572 rotates through an angle of Z degrees, axis 586 is displaced vertically a distance Y and horizontally a distance X. In preferred embodiments $Z = \pm 56°$, $E = 0.060''$ and therefore is $Y = \pm 0.050''$.

In embodiments of the present invention where the outer surface of bearing 570 does not move relative to the circumferential surface of cylinder 572, or where a separate bearing device is not employed between cylinder 572 and plunger 528, the outer surface of the eccentric arrangement slides through the horizontal displacement distance relative to the end face of plunger 528 as cylinder 572 rotates.

In embodiments where, as illustrated in FIGS. 5 and 6, separate bearing 573 is mounted on cylinder 572, inner race 577 can, for example, remain substantially fixed with respect to the circumferential surface of cylinder 572 while ball elements 575 permit outer race 579 to roll with respect to the end face of plunger 528. Such rolling action typically incurs less friction and drag them sliding action. Thus, the actuation response time of valve 520 and the load stress and wear on motor 580 are further decreased. As a result, the operating system can provide even greater reliability and precision as well as an increased operational lifetime.

In the exemplary embodiments shown, as cam 570 rotates to compress spring 529 and move plunger 528 upwardly a fluid path is defined through valve 520 between supply line 512 and control line 516. At the same time another fluid path is defined through valve 520 between control line 518 and return line 514. Likewise, when cam 570 rotates to permit spring 529 to force plunger 528 downwardly separate fluid paths are defined between supply line 512 and control line 518 and between control line 516 and return line 514. The dimensional openings of these fluid paths, and, thus, the amount of hydraulic flow, are precisely controlled by the vertical displacement of plunger 528 from rotation of cam 570.

Figure 7:
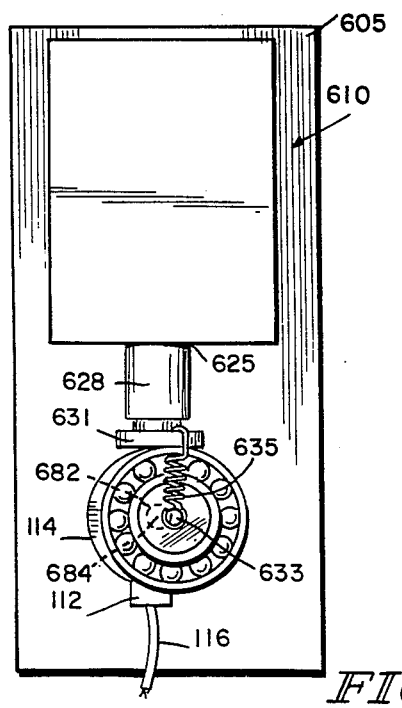
FIG. 7 shows a front elevational view of another embodiment of the eccentric cam valve operating system of the present invention.
Figure 8:
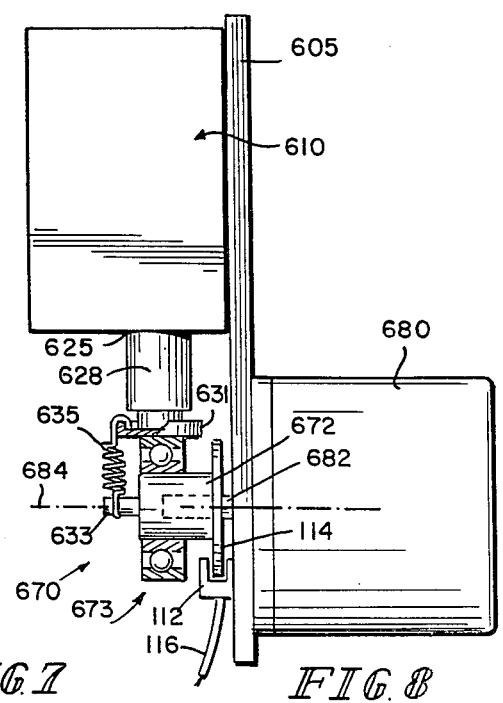
FIG. 8 shows a side elevational view of the embodiment of FIG. 7 with portions of the bearing arrangement broken away.

For some applications of the present invention it is particularly useful to minimize the actuation response time of valve 520 and load stress on motor 580 even further. FIGS. 7 and 8 illustrate one further embodiment of the present invention to achieve these goals. Briefly, by comparison, biasing spring 529 has been replaced by a tensioning spring arrangement to maintain contact between plunger 528 and cam 570.

Valve housing 610 is illustrated as fixed with respect to stepping motor 680 via bracket plate 605. Plunger 628 extends from port 625 in housing 610 and includes a collar 631 formed adjacent its end face. Stepping motor 680 includes rotational output shaft 682 having longitudinal axis 684. Cam cylinder 672 is mounted on shaft 682 off center from longitudinal axis 684 such that circular rotation of shaft 682 causes eccentric rotation of cylinder 672. Bearing member 673 is mounted about the circumference of cylinder 672. Plunger 628 abuts the outer surface of the bearing member.

Cylinder 672 includes shaft 633 extending from the longitudinal axis of that cylinder. Tensioning spring 635 is mounted at one end on shaft 633 and at its other end on collar 631. This tensioning spring arrangement maintains contact between plunger 628 and cam 670 as cylinder 672 rotates in either direction. Since the distance between shaft 633 and collar 631 varies only slightly, spring 635 can exert a substantially constant and relatively slight force as compared to the relatively stronger and typically variable force exerted by spring 529 in the embodiment of FIG. 5. As a result, load stress on the stepping motor can be even further reduced. Also, in the event of stepping motor failure, this spring arrangement can avoid a tendency to force the valve to a different position. In addition, with some assembly structures, placement of spring 635 exteriorly of valve housing 610 simplifies construction, maintenance and/or repair.

The embodiment of FIGS. 7 and 8 also illustrates in greater detail the arrangement for optical detector 112 and vane 114 shown in FIG. 1. Vane 114 is, for example, a circular disc mounted on shaft 682 coaxially with longitudinal axis 684. Optical detector 112 is then preferably mounted to bracket plate 605. Alternatively, the position sensor arrangement can be disposed within the stepping motor.

While spring 635 can secure substantially constant contact between the plunger and the cam, in certain circumstances, as where cylinder 672 suddenly rotates clockwise through a relatively large angle, there may be some slight hesitation in the downward motion of the plunger, depending upon the stiffness of spring 635. In those applications where even this slight hesitation is undesirable, the embodiments of FIGS. 9 and 10 can be advantageously employed. Briefly, this embodiment provides a springless connection arrangement to secure the plunger to the cam.

Figures 9, 10:
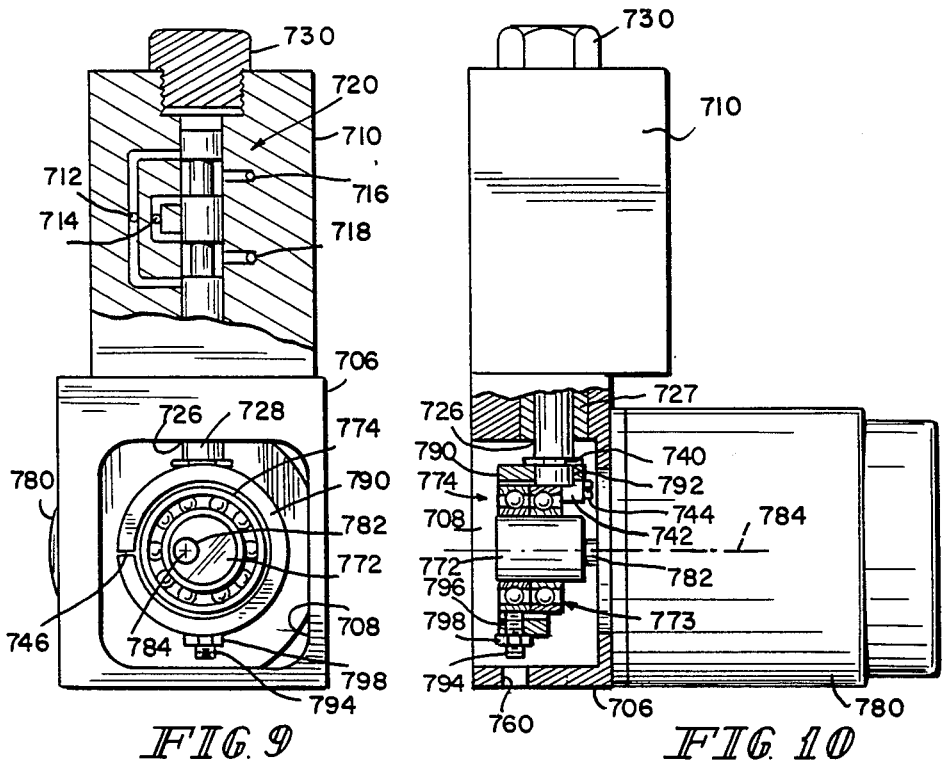
FIG. 9 shows a front elevational view of yet another embodiment of the eccentric cam valve operating system of the present invention with portions of the valve housing broken away.
FIG. 10 shows a side elevational view of the embodiment of FIG. 9 with portions of the bearing arrangement broken away.

In FIGS. 9 and 10, valve housing 710 and stepping motor 780 are, for example, each connected to cam housing 706. Plunger 728 extends from port 726 into cavity 708 in the cam housing. In certain embodiments it may be especially advantageous to line port 726 with bearing sleeve 727. As with the embodiments of FIGS. 5 and 7, it has been found to be advantageous to form plunger 728 integrally with valve spool 720.

Stepping motor 780 includes a rotational output shaft 782 extending into cavity 708 and having longitudinal axis 784. Cam cylinder 772 is mounted on shaft 782 off center from longitudinal axis 784 such that circular rotation of shaft 782 causes eccentric rotation of cylinder 772. Bearing members 773 and 774 are mounted in stacked relation about the circumference of cylinder 772.

Plunger 728 is secured to the eccentric cam arrangement by a spool ring structure. Spool ring 790 is disposed around and spaced apart from the circumference of the bearing members. Plunger 728 passes through opening 792 in spool ring 790 and abuts the outer surface of bearing member 773, preferably without contacting bearing member 774. Lock ring 740 serves to precisely locate the plunger penetration through spool ring 790. A loading pin 794 is provided opposite plunger 728 which passes through opening 796 in spool ring 790 and abuts the outer surface of bearing member 774. Spool ring 790 is thus positioned about the bearing arrangement on the end faces of plunger 728 and loading pin 794.

Preferably, loading pin 794 does not contact bearing member 773. It has also been found to be advantageous to provide loading pin 794 with an exterior threaded surface and opening 796 with a mating, interior threaded surface. In this manner, loading pin 794 can be fixedly secured to spool ring 790. For additional security, a threaded stop nut 798 also can be applied to loading pin 794.

To accommodate vertical movement of loading pin 794, housing 706 is, for example, provided with opening 760. This opening can be formed to permit access of an adjustment tool to loading pin 794 during assembly, maintenance or repair. In addition, cavity 708 can thus be closely dimensioned to the movement extremes of spool ring 790 without allowance for the protrusion of the loading pin.

Spool ring 790 is, for example, formed as a partially split yoke at port 792. As shown in FIG. 10, the portion 742 of spool ring 790 which envelops plunger 728 does not extend about the circumference of bearing 773. The split (not shown) is formed between the circumferentially extending portion of the spool ring and portion 742 such that plunger 728 can be easily slid into port 792. Once properly in place, threaded screw 744 is employed to squeeze portion 742 toward the remainder of spool ring 790 and thereby releasably fix the location of plunger 728 with respect to the spool ring. Alternatively, in certain circumstances plunger 728 can be press fit into spool ring 790. In addition, the spool ring can, for example, include a longitudinal split 746 to permit relatively minimal spring-like expansion during use.

As cylinder 772 rotates about axis 784, the cam surface abutting plunger 728 is displaced vertically and horizontally within cavity 708. The abutment arrangement of the spool ring, loading pin and plunger end face permit the spool ring and plunger to be carried vertically within cavity 708 along with that cam surface. However, while the plunger end face and loading pin abut the bearing surfaces, they do not clamp those surfaces. Thus, horizontal rolling and/or sliding motion of the bearings relative to the plunger and loading pin results which permits the spool ring to avoid horizontal movement despite horizontal movement of the eccentric cam within the spool ring.

For example, with the stacked bearing arrangement of FIGS. 9 and 10, horizontal component movement of cam cylinder 772 to the left causes clockwise rolling of the outer surface of bearing 773 relative to the end face of plunger 728 and counterclockwise rolling of the outer surface of bearing 774 relative to the end face of loading pin 794. The spacing within the spool ring is such that the cam arrangement is movable horizontally without binding on the inner surface of the spool ring. By comparison with the embodiment of FIGS. 5 and 6, typical operational dimensions of this later embodiment are: $Z = \pm 25°$, $E = 0.118''$ and therefore again $Y = \pm 0.050''$. Further, because of the relatively rigid connection, the response time is virtually instantaneous. Also, with less friction and motor load, this embodiment permits the stepping motor to very precisely position the valve.

For specific applications, further embodiments are also contemplated by the present invention. For example, the stacked bearing arrangement of FIGS. 9 and 10 can employ bearings of different radial dimensions in order to further minimize stepping motor load.

Referring back to the overall system, in particular embodiments of the present invention, it has been found advantageous to employ several micro computer systems in series or to split the computer function into separate levels. A first complete system or level would contain the user program and directly receive the command signals. The second computer system or level would receive the interpreted command signals from the first computer system or level, calculate the current in the stepper motor windings and modulation thereof necessary to actuate valve 20 to implement the command signals, and produce the appropriate output control signal for D/A 95 and driver 90. Thus, the control signals of computer 100 would, for example, follow a discontinuous curve in driving the actual system condition to the desired system condition represented in the command signals.

In the embodiment shown in FIG. 1, glass scale 102 monitors the linear position and/or velocity of slide 40 and provides feedback signals to computer 100 along line 104. A suitable commercially available glass scale is, for example, the Bausch and Lomb "mini-scale", part number 380706 or 889720. Also, encoder 106 indirectly monitors the angular position and/or velocity of tool 62 through rotation of shaft 58 and provides feedback signals to computer 100 along line 108. A suitable commercially available encoder is, for example, made by Litton Encoder Division of Litton Industries as model 70-E/M. These feedback signals enable computer 100 to generate error signals calculated from the difference between the desired and actual status of the movable machine tool elements, as described hereinbelow.

It has been found to be advantageous to provide feedback signals alone line 110 from valve 30 to computer 100 to indicate whether valve 30 is switching hydraulic pressure to slide 40 or tool 62.

Further, optical detector 112 is provided to detect the position of vane 114 which is secured to shaft 82. Vane 114 is positioned on shaft 82 and aligned through cam 70 with respect to valve 20 such that, when valve 20 is precisely in null position 24, vane 114 is at a specific known location detectable by optical detector 112. Feedback signals indicative of this precise null position are provided by optical detector 112 to computer 100 along line 116. Such feedback signals are particularly advantageous where it is desired to provide control signals to stepping motor 80 to zero out and compensate for power-up surges.

Figure 2:
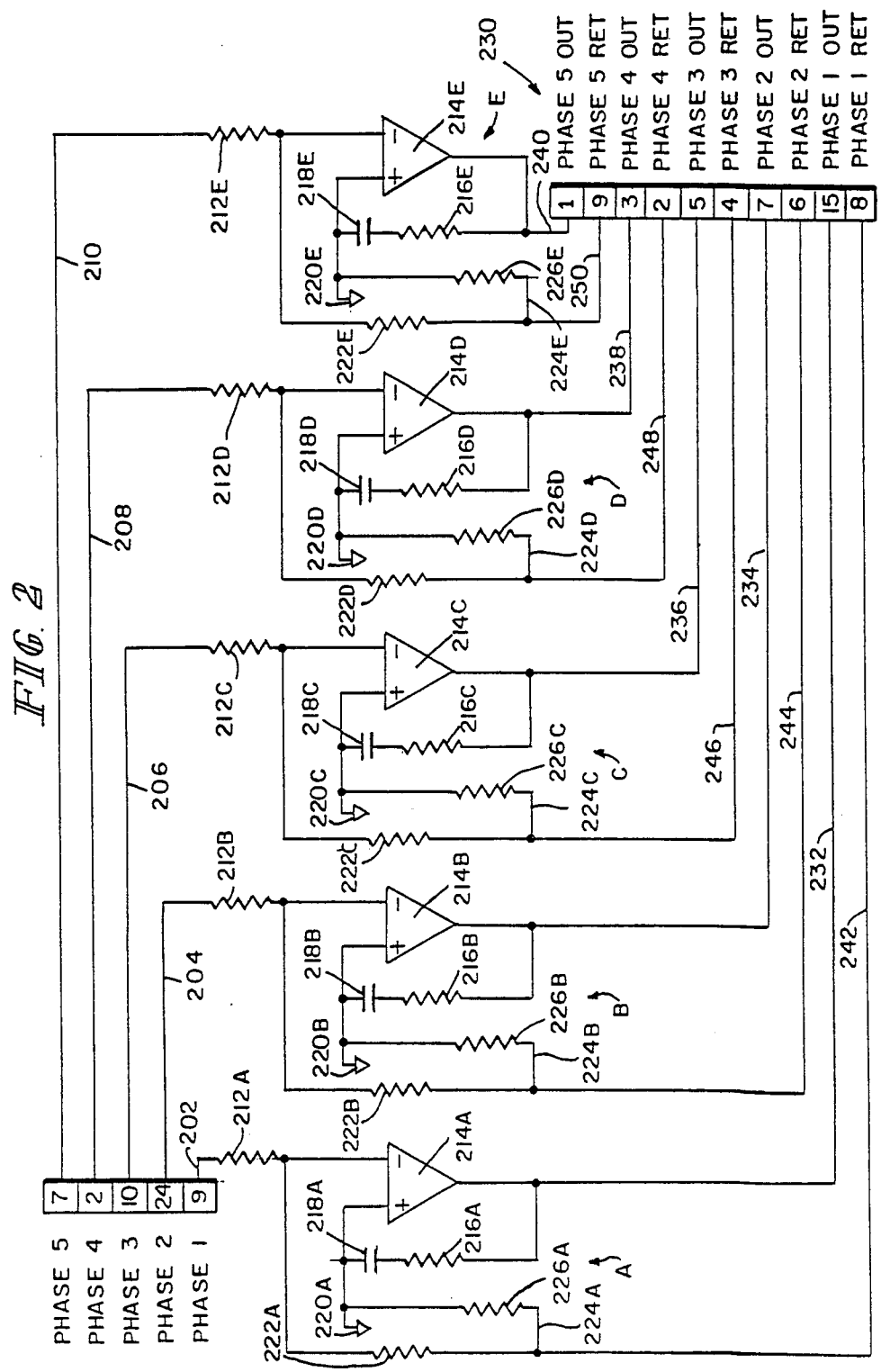
FIG. 2 shows schematically the circuit diagram for the stepping motor driver of FIG. 1, according to the principles of the present invention.

FIG. 2 illustrates schematically the details of driver 90 for controlling the supply of current to each winding of stepping motor 80. That stepping motor is preferably a five phase motor and, thus, driver 90 includes separate stages A-E for individually controlling the current through each winding. While only a five phase stepping motor is described in detail below, the present invention specifically contemplates use with stepping motors having a different number of phases.

Driver 90 also includes control signal input 200 having individual input lines 202, 204, 206, 208 and 210 corresponding to control signals received through D/A 95 from computer 100 for phases 1-5, respectively, of stepping motor 80. Input line 202 provides signals to stage A through resistor 212A. Stage A includes power operational amplifier 214A whose negative input terminal is connected to input line 202. The positive input terminal and the output of amplifier 214A, the latter through a feedback loop containing resistor 216A and capacitor 218A in series, is connected to ground or signal drain 220A. The output of amplifier 214A is also connected to control signal output 230 along line 232. The control signal from line 232 is input to the phase 1 control winding of stepping motor 80. The return current line from that phase 1 control winding is connected to return line 242 and, through resistor 222A, to the negative input terminal of amplifier 214A. Return line 242 is also connected to line 224A and, through resistor 226A in parallel with resistor 222A, to ground 220A.

Although driver 90 has been described above only with respect to single stage A, it will now be readily understood by those skilled in the art that a similar arrangement is included for stages B-E. Specifically, input lines 204, 206, 208, and 210 provides signals to stages B-E through resistors 212 B-E, respectively. Likewise, the circuit components of each of stages B-E are arranged similarly such that input lines 204, 206, 208 and 210 are connected to the negative input terminal of amplifiers 214 B-E, respectively; positive input terminals and the outputs of amplifiers 214 B-E, the latter through feedback loops containing resistors 216 B-E and capacitors 218 B-E in series, are connected to grounds 220 B-E, respectively; the outputs of amplifiers 214 B-E are also connected to control signal output 230 along lines 234, 236, 238 and 240 and input to the phase 2-5 control windings, respectively, of stepping motor 80; and return lines 244, 246, 248 and 250 are connected to the negative input terminals of amplifiers 214 B-E through resistors 222 B-E and, along lines 224 B-E and through resistors 226 B-E in parallel with resistors 222 B-E, to ground 220 B-E, respectively.

Depending upon the particular stepping motor and control system component characteristics, various modifications will be made in the driver 90 to meet specific stability constraints. For example, with the commercially available stepping motor described above, the negative input terminals of amplifiers 214 A-E are connected to grounds 220 A-E, respectively, through another resistor (not shown in FIG. 2).

In operation, driver 90 typically controls current flow through stepping motor 80 such that four of the windings are continuously fully energized with true DC current flowing in either the positive or negative direction up to the rating of that stepping motor. The fifth winding is considered the control winding for that phase and is controlled by slowly changing current flows from a full positive level down through zero and to a full negative level. This driver arrangement provides extremely precise control and responsiveness of the stepping motor due to the linear control of the current in each individual winding. Tests have shown that the accuracy of the drive of the present invention achieves the equivalent of at least 127,000 increments through one revolution of the stepping motor.

It is believed that this greatly improved result arises because the use of true DC current in each stepping motor winding prevents current inductance from being introduced to the control winding from adjacent windings. Such inductance, resulting from pulsed currents through windings of chopper driven motors, have caused stepping motors to act as transformers, with the resulting loss in control system precision. Previously, it might be expected that a driver applying such true DC current to a stepping motor would be unsuitable for control systems in machine tools since the stepping motor speed would be severely limited by such a DC current control. However, with the eccentric cam and hydraulic actuator arrangement of the present invention, high stepping motor speeds are unnecessary. Shaft 82 only needs to rotate through ±45° to fully actuate valve 20 from position 22 to position 26 and several thousand incremental steps are still provided.

Computer 100 of FIG. 1 is programmed to provide control signals which avoid control system inaccuracies and imprecisions and give significantly improved accuracy. This programming may, for example, be embodied in internal PROMs and/or input by floppy disks. Briefly, the preferred programming of the present invention includes a two-part algorithm wherein large deviations between the desired system condition and the actual system condition are processed to mos quickly slow the stepping motor to approximately the desired condition. Once this rough approximation is made, or where there are small deviations between the desired and actual system conditions, a second part of the algorithm processes control signals to precisely achieve the desired condition by taking into account various feedback signals received by computer 100 as well as known characteristics of the control and/or hydraulic actuating system. These characteristics include, for example, various component hystereses, response lag times, and stepping motor resolution. The feedback signals indicate, for example, the actual position and/or velocity of the movable elements actuated by the hydraulic system as well as various operating characteristics, such as variations in the load on those movable elements.

Figure 3:
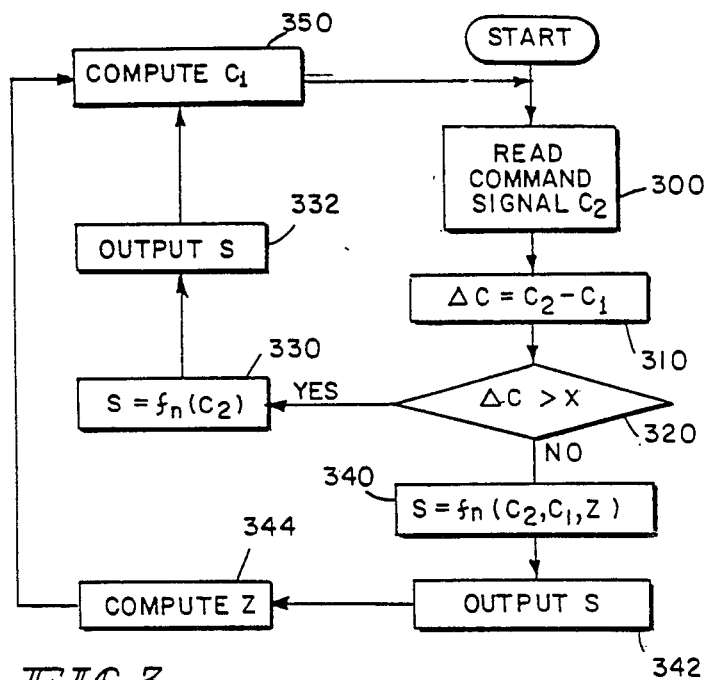
FIG. 3 shows a flow chart for control programming of the control system of FIG. 1, according to the principles of the present invention.

FIG. 3 illustrates a flow chart for a method of generating control signals which is embodied in the programming of computer 100 according to the present invention. After "start", computer 100 reads the user input command signals, according to step 300. These command signals indicate the desired condition, for example, position and/or velocity of movable elements actuated by the hydraulic system, of FIG. 1, and are designated as $C_2$. In step 310, the error or deviation between the actual condition, designated as $C_1$, and the desired condition is calculated and an error signal, designated as $\Delta C$ is produced. In step 320, $\Delta C$ is compared with a predetermined level, designated as X. If $\Delta C$ exceeds X, control signals to the driver and stepping motor, designated as S, are calculated according to step 330. If $\Delta C$ becomes less than X, control signals S are calculated according to step 340.

In step 330, S is calculated, for example, as a function of $C_2$. Since the deviation between $C_2$ and $C_1$ is large, it is desirable to provide control signals which will achieve a rough approximation of the desired condition as quickly as possible. As long as $\Delta C$ is large, feedback signals and system characteristics are ignored in calculating S. Once this S is obtained, it is output through the control system according to 332. In step 350, the effect of these control signals is determined in that a new $C_1$ is computed from feedback signals and the control program cycle continues again with step 300.

In calculations of S according to step 340, S is, for example, a function of $C_1$, $C_2$, and Z, where Z designates feedback signals and system characteristics. Since deviation between $C_2$, and $C_1$, is small, it is desirable to provide control signals which precisely achieve the desired condition. Typically, an initial control signal level is calculated from the feedback signals to make $\Delta C$ equal to zero and then that initial signal is modified in order to compensate for system characteristics. Once S is obtained, it is output through the control system according to step 342. Since $\Delta C$ is small, in steps 344 and 350 the effect of these control signals is determined in that new Z and $C_1$ values are computed, respectively, and the control program cycle continues again with step 300.

Such a two part program permits the control system to slow to the desired condition relatively quickly without gradually slowing down until the deviation falls below a predetermined X value. Where, for example, $C_2$ represents a desired velocity, S calculated according to step 330 is the same value for every program cycle until $\Delta C$ is less than X. Thus, the system response time is made as fast as possible during the rough approximation.

Without then calculating S according to step 340 the imprecisions and instabilities of prior control systems are not avoided. By taking component hystereses and lag time into account, the control system may make a larger correction than required to achieve the desired condition (overshooting) and then back off. Thus, the digital control system response of the present invention more closely resembles the actual response of the hydraulic actuating system than prior analogue control systems wherein control signals gradually decrease $\Delta C$ along a continuous curve. The program of the present invention has been found to significantly reduce oscillation of control signals about the desired condition.

System characteristics may be programmed into computer 100 or the program may he self-training during, for example, power-up of the machine tool. Some characteristics, such as operating load may be monitored and feedback signals provided to the computer. Complete customization and compensation for non-linear displacement response of hydraulic actuating system components is provided by the control program of the present invention. Also, certain maximum and minimum operating values which are precisely determined can be programmed into the computer so that control signals are generated which immediately achieve that condition when desired.

Figure 4:
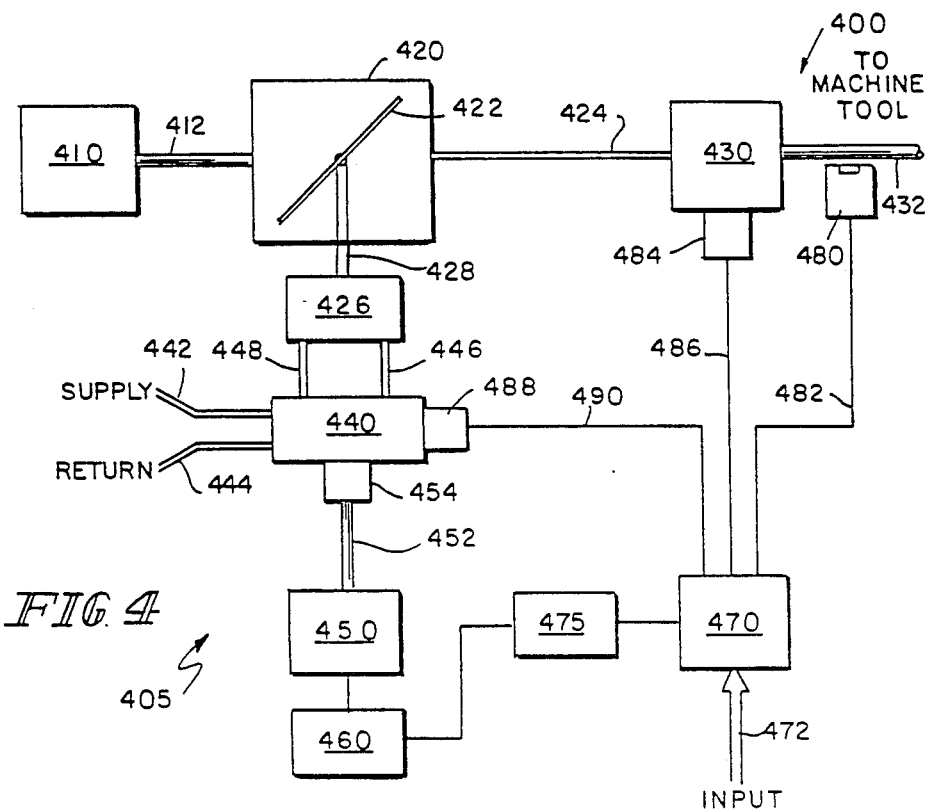
FIG. 4 shows, in block diagram form, another control system and hydraulic actuating system embodying the principles of the present invention.

The control system and computer program therefor of the present invention has been found to be especially suitable for use in hydrostatic transmission systems. FIG. 4 illustrated hydrostatic transmission system 400 embodying the principles of the present invention which is, for example, used to provide a constant rotational velocity for a machine tool spindle (not shown). Constant speed electric motor 410 provides rotational power along output shaft 412 to drive variable displacement pump (VDP) 420. The fluid output of VDP 420 is thus determined by the displacement of internal swash plate 422. Hydraulic actuator 426 controls the displacement of swash plate 42 through actuator linkage 428. The output of VDP 420 is provided to fluid motor 430 along line 424. Fluid motor 430 provides rotational power along output shaft 432 to, for example, a rotatable machine tool spindle (not shown).

It is often desirable that the rotational speed of that machine tool remain constant despite variations in operating conditions, such as load and temperature, and that changes in the rotational speed be accomplished immediately. To achieve these goals, the control system of the present invention includes hydraulic valve 440 for controlling hydraulic pressure flow between supply line 442 and return line 444 and control lines 446 and 448. These latter control lines are connected to hydraulic actuator 426 and serve to supply the hydraulic pressure to and from that actuator which causes displacement of swash plate 422.

Valve 440 is precisely actuated by multi-phase stepping motor 450 which, as in the embodiment of FIG. 1, provides rotational force along output shaft 452 to actuator arrangement 454 which controls operation of valve 440. This actuator arrangement is, for example, similar to the eccentric cam-plunger arrangement described above with regard to FIG. 1. The rotation of output shaft 452 and the resolution of stepping motor 450 is controlled by driver 460 which receives control signals from computer 470 through D/A 475.

Computer 470 receives command signals indicative of the desired rotational speed of the machine tool from the user along input 472. In addition, detectors 480, 484 and 488 monitor the actual rotational speed of the machine tool indirectly through the rotation of output shaft 432, the hydraulic pressure within fluid motor 430 (which indicates, for example, load conditions on the machine tool spindle), and the null position of valve 400, respectively. Detectors 480, 484 and 488 provide feedback signals along lines 482, 486, and 490, respectively, to computer 470. Depending upon the level of precision necessary, in particular embodiments of the present invention not all of these detectors will be necessary. The components and operation of control system are similar to that described above with regard to FIGS. 1, 2, and 3.

To avoid the instabilities and unresponsiveness of prior control systems for hydrostatic transmissions, the present invention accounts for the hysteresis and deadband in displacement of swash plate 422 as well as varying load conditions applied to fluid motor 430 through the machine tool spindle which will result in a decrease in the motor output speed. The stroke of VDP 420 is increased to compensate for this decrease. Typically it is desirable to provide immediate compensation for even very small deviations. The control system of the present invention provides limited modulation of swash plate 422 about the desired position in order to compensate for its hysteresis and deadband and to accurately position the swash plate over small increments.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A precise actuating system for a valve comprising:
   a valve element;
   an eccentric cam assembly;
   said eccentric cam assembly including a cam cylinder and a bearing arrangement rotatably mounted about said cam cylinder;
   a connection linkage operably associating said valve element and said cam assembly such that rotational motion of said cam assembly causes translational positioning of said valve element; and
   said connection linkage means including biasing means connected to said valve element and said cam assembly for preventing separation of said valve element and said cam assembly.

2. The actuating system according to claim 1 wherein said valve element forms a spool valve member having a longitudinal axis and being slideable therealong to control fluid flow.

3. The actuating system according to claim 2 wherein said connection linkage includes a plunger portion connected to said spool valve member, said plunger portion including an end face abutting said cam assembly, said bearing arrangement includes an inner and an outer bearing race, and said end face restricts movement of said outer bearing race.

4. The actuating system according to claim 3 wherein said biasing means maintains contact between said end face and said cam assembly during rotation of said cam assembly.

5. The actuating system according to claim 4 wherein said biasing means includes a tensioning spring connected between said plunger portion and said cam assembly, said tensioning spring biasing said plunger portion to oppose motion of said end face away from said cam assembly.

6. The actuating system according to claim 4 wherein said biasing means includes a flexible spool ring mounted about said cam assembly and fixedly connected to said plunger, said cam assembly being relatively movable within said spool ring.

7. A valve actuating system comprising:
   a valve housing;
   a longitudinally extending bore disposed within said housing;
   a valve plunger slidably disposed with said bore;
   a valve member adjacent to said plunger and actuatable by sliding motion of said plunger within said bore;
   a rotatable, eccentric cam arrangement;
   said cam arrangement including a cam cylinder disposed for eccentric rotation and a bearing means mounted for rotation about said cam cylinder;
   connection linkage means for establishing actuating engagement between said plunger and said cam arrangement;
   said connection linkage means including biasing means connected to said plunger and said cam arrangement for maintaining contact between said plunger and said cam arrangement during rotation of said cam cylinder; and
   said actuation engagement translating eccentric rotation of said cam cylinder into sliding motion of said plunger.

8. The valve actuating system according to claim 7 wherein said cam arrangement includes a longitudinally extending cam cylinder mounted for eccentric rotation off center from its longitudinal axis, a cylinder stem extending along said longitudinal axis for securing said biasing means to said cam arrangement, and a rolling bearing mounted between said cam cylinder and said plunger.

9. The valve actuating system according to claim 7 wherein said connection means includes a ring mounted about said cam arrangement and secured to said plunger.

10. The valve actuating system according to claim 9 wherein said ring is mounted about said cam arrangement by a relatively movable connection such that eccentric rotation of said cam arrangement causes movement of said ring only along the longitudinal axis of said bore.

11. The valve actuating system according to claim 10 wherein said cam arrangement is rotated by a drive shaft and said cam cylinder is mounted off center on said drive shaft for eccentric rotation and said bearing means is mounted between said cam cylinder and said ring.

12. The valve actuating system according to claim 11 wherein said connection means further includes a loading pin secured to said ring and wherein said ring is spaced apart from said cam arrangement and is secured thereto by engagement of said plunger and said loading pin with the outer surface of said bearing means.

13. The valve actuating system according to claim 12 wherein said bearing means includes a plurality of bearing elements mounted about said cam cylinder, said plunger and said loading pin engaging separate bearing elements such that these bearing elements are independently movable with respect to said cam cylinder.

14. A valve actuating system for hydraulic control systems, comprising:
   a valve housing;
   a longitudinally extending bore within said housing;
   a plunger element slidably disposed within said bore;
   a valve member connected to said plunger and actuatable by sliding motion of said plunger within said bore;
   a stepping motor having a rotatable drive shaft extending therefrom;
   a cam arrangement mounted to said drive shaft for eccentric rotation;
   said plunger including a portion extending from said housing and disposed abutting said cam arrangement;
   said cam arrangement including a longitudinally extending cam cylinder and a bearing assembly mounted about said cam cylinder, an outer surface of said bearing means abutting a portion of said plunger;
   linkage means for maintaining the abutment relationship of said plunger to said cam arrangement during eccentric rotation of said cam arrangement such that said eccentric rotation results in said sliding motion of said plunger within said bore; and
   said linkage means including biasing means connected to said plunger and said cam arrangement for maintaining contact between said plunger and said cam arrangement.

15. The valve actuating system according to claim 14 wherein said stepping motor includes sensor means associated therewith for detecting the rotational position of said drive shaft.

16. An actuating system for selectively positioning a valve, comprising:
a linearly movable valve element;
a reciprocally rotatable drive shaft;
a cylindrical cam assembly mounted on said drive shaft for eccentric rotation;
a bearing assembly mounted about said cam assembly;
said bearing assembly including an inner race, an outer race and roller elements between said inner and outer races;
a connection element engaging said valve element and said outer race;
linkage means for maintaining engagement of said connection element with said valve element and said outer race so as to permit translation of rotational motion of said drive shaft into linear motion of said valve element to selectively position said valve; and
said linkage means including flexible means connected to said connection element and either said cam assembly or said bearing assembly for maintaining engagement of said connection element and said outer race.

17. The actuating system according to claim 16 wherein said flexible means includes a tensioning means for preventing motion of said connection element away from said outer race without applying biasing force against said valve element.

18. The actuating system according to claim 17 wherein said tensioning means includes a spring connected between said connection element and said cam assembly.

19. The actuating system according to claim 18 wherein said cam assembly includes an extension portion along its longitudinal axis and said spring is connected to said extension portion.

20. The actuating system according to claim 18 wherein said spring is so connected that substantially no spring expansion occurs during selective positioning of said valve.

21. The actuating system according to claim 18 wherein said spring is so connected that selective positioning of said valve results in substantially constant spring force being applied by said spring to said connection element.

22. The actuating system according to claim 16 wherein said linkage means permits rolling engagement of said outer race with said connection element in response to eccentric rotation of said cam assembly so as to minimize frictional drag in producing linear motion of said valve element through rotational motion of said drive shaft.

23. An acutating system for selectively positioning a valve element within a valve, comprising:
a linearly movable valve element;
a selectively rotatable drive shaft;
a cylindrical cam means mounted off-center from its longitudinal axis onto said drive shaft for eccentric rotation coincident with drive shaft rotation;
first and second bearing assemblies mounted about said cam means in stacked relation to the longitudinal axis of said cam means;
each of said bearing assemblies including an inner race, an outer race and roller elements between said inner and outer races;
a connection element engaging said valve element and the outer race of said first bearing assembly;
linkage means for maintaining engagement of said connection element with said valve element and the outer race of said first bearing assembly so as to permit translation of rotational movement of said drive shaft into linear motion of said valve element; and
said linkage means including biasing means connected to said connection element and either said cam means or said second bearing assembly for maintaining engagement of said connection element and said outer race of said first bearing assembly.

24. An actuating system for selectively positioning a valve element within a valve, comprising:
a linearly movable valve element;
a selectively rotatable drive shaft;
a cylindrical cam means mounted off-center from its longitudinal axis onto said drive shaft for eccentric rotation coincident with drive shaft rotation;
first and second bearing assemblies mounted about said cam means in stacked relation to the longitudinal axis of said cam means;
each of said bearing assemblies including an inner race, an outer race and roller elements between said inner and outer races;
a connection element engaging said valve element and the outer race of said first bearing assembly;
linkage means for maintaining engagement of said connection element with said valve element and the outer race of said first bearing assembly so as to permit translation of rotational movement of said drive shaft into linear motion of said valve element; and
said linkage means including means for limiting movement of said linkage means away from the direction of linear motion of said valve element in response to eccentric rotation of said cam means.

25. An acutating system for selectively positioning a valve element within a valve, comprising:
a linearly movable valve element;
a selectively rotatable drive shaft;
a cylindrical cam means mounted off-center from its longitudinal axis onto said drive shaft for eccentric rotation coincident with drive shaft rotation;
first and second bearing assemblies mounted about said cam means in stacked relation to the longitudinal axis of said cam means;
each of said bearing assemblies including an inner race, an outer race and roller elements between said inner and outer races;
a connection element engaging said valve element and the outer race of said first bearing assembly;
linkage means for maintaining engagement of said connection element with said valve element and the outer race of said first bearing assembly so as to permit translation of rotational movement of said drive shaft into linear motion of said valve element; and
said linkage means including a split ring element mounted about and spaced apart from said first and second bearing assemblies.

26. The actuating system according to claim 25 wherein said split ring element is attached to said connection element and includes a first portion abutting said first bearing assembly and a second portion abutting said second bearing assembly.

27. The actuating system according to claim 26 wherein said first and second portions are opposingly disposed about said split ring element, said first portion is disposed so as to permit rolling engagement with the outer race of said first bearing assembly in response to eccentric rotation of said cam means, and said second portion is disposed so as to permit rolling engagement with the outer race of said second bearing assembly in response to eccentric rotation of said cam means.

28. The actuating system according to claim 27 wherein said first portion is spaced apart from said second bearing assembly, said second portion is spaced apart from said first bearing assembly, and rolling engagement of said first portion with the outer race of said first bearing assembly is in a direction opposite to rolling engagement of said second portion with the outer race of said second bearing assembly.

29. The actuating system according to claim 1 wherein said bearing engagement includes first and second bearing assemblies longitudinally offset along said cam cylinder, said valve element engaging said first bearing assembly and said biasing means engaging said second bearing assembly.

30. The actuating system according to claim 7 wherein said bearing means includes first and second bearing members, said valve plunger engaging said first bearing member and said biasing member engaging said second bearing member.

* * * * *